US012125624B2

(12) United States Patent
Hayashii et al.

(10) Patent No.: US 12,125,624 B2
(45) Date of Patent: Oct. 22, 2024

(54) COIL COMPONENT

(71) Applicant: Murata Manufacturing Co., Ltd., Kyoto-fu (JP)

(72) Inventors: Ken Hayashii, Nagaokakyo (JP); Ryota Hashimoto, Nagaokakyo (JP); Kaori Takezawa, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 650 days.

(21) Appl. No.: 17/370,921

(22) Filed: Jul. 8, 2021

(65) Prior Publication Data

US 2022/0051839 A1 Feb. 17, 2022

(30) Foreign Application Priority Data

Aug. 13, 2020 (JP) ................................ 2020-136587

(51) Int. Cl.
*H01F 17/04* (2006.01)
*H01F 27/28* (2006.01)
*H01F 27/29* (2006.01)
*H01F 27/30* (2006.01)

(52) U.S. Cl.
CPC ....... *H01F 17/045* (2013.01); *H01F 27/2828* (2013.01); *H01F 27/292* (2013.01); *H01F 27/306* (2013.01)

(58) Field of Classification Search
CPC .. H01F 17/045; H01F 27/2828; H01F 27/292; H01F 27/306
See application file for complete search history.

(56) References Cited

U.S. PATENT DOCUMENTS

| | | | | |
|---|---|---|---|---|
| 3,947,795 A * | 3/1976 | Donnelly | H01F 27/306 | 336/84 R |
| 2002/0130752 A1* | 9/2002 | Kuroshima | H01F 17/043 | 336/200 |
| 2014/0210584 A1* | 7/2014 | Blow | H01F 27/255 | 336/173 |
| 2017/0011844 A1* | 1/2017 | Mikogami | H01F 41/127 | |
| 2017/0288626 A1* | 10/2017 | Kobayashi | H01F 41/069 | |
| 2018/0166204 A1* | 6/2018 | Kobayashi | H01F 17/0033 | |
| 2019/0392973 A1* | 12/2019 | Hashimoto | H01F 27/24 | |

FOREIGN PATENT DOCUMENTS

| | | |
|---|---|---|
| JP | H11-317309 A | 11/1999 |
| JP | 2017-183444 A | 10/2017 |
| JP | 2019-220622 A | 12/2019 |

* cited by examiner

*Primary Examiner* — Malcolm Barnes
(74) *Attorney, Agent, or Firm* — Studebaker & Brackett PC

(57) ABSTRACT

A coil component that includes a core, a first wire, and a second wire. The core has a prism-shaped winding core part. The first wire and the second wire are wound around the winding core part. The coil component has an overlapping winding region in which the first wire is wound around the winding core part and the second wire is wound around the winding core part on top of the first wire. The overlapping winding region includes a prescribed part in which the first wire and the second wire are wound around the winding core part in such a manner that a gap is interposed between a part of the first wire that is wound along a first side surface of the winding core part and a part of the second wire that is wound along the first side surface.

20 Claims, 6 Drawing Sheets

COIL COMPONENT

CROSS-REFERENCE TO RELATED APPLICATION

This application claims benefit of priority to Japanese Patent Application No. 2020-136587, filed Aug. 13, 2020, the entire content of which is incorporated herein by reference.

BACKGROUND

Technical Field

The present disclosure relates to a coil component in which a plurality of wires are wound around a winding core part of a core.

Background Art

Japanese Unexamined Patent Application Publication No. 2017-183444 discloses an example of a common mode choke coil. The common mode choke coil includes a core, a first wire, and a second wire. The core includes a winding core part around which the first wire and the second wire are wound, a first flange part that is connected to a first end of the winding core part, and a second flange part that is connected to a second end of the winding core part.

The above-described common mode choke coil has an overlapping winding region in which the first wire and the second wire are wound so as to overlap each other. The overlapping winding region has a multi-layered winding structure in which the first wire is wound around the winding core part and the second wire is wound around the winding core part on top of the first wire. In this multi-layered winding structure, since the wire density is high, line capacitances between the first wire and the second wire tend to be large.

SUMMARY

Accordingly, a coil component is provided that includes a core including a prism-shaped winding core part, a first flange part that is connected to a first end of the winding core part in an axial direction of the winding core part, and a second flange part that is connected to a second end of the winding core part in the axial direction of the winding core part; and a first wire and a second wire that are wound around the winding core part. The winding core part has a first side surface, a second side surface that is connected to the first side surface via a first corner, and a third side surface that is connected to the first side surface via a second corner. The coil component has an overlapping winding region that is a region in which the first wire is wound around the winding core part and the second wire is wound around the winding core part on top of the first wire. The overlapping winding region includes a prescribed part that is a part in which the first wire and the second wire are wound around the winding core part in such a manner that a gap is interposed between a part of the first wire that is wound along the first side surface and a part of the second wire that is wound along the first side surface.

According to this configuration, in the prescribed part of the overlapping winding region, the first wire and the second wire are wound around the winding core part in such a manner that a gap is interposed between a part of the first wire that is wound along the first side surface and a part of the second wire that is wound along the first side surface. This enables a part to be provided in which there is a long distance between the first wire and the second wire. In other words, a part is formed in which the wire density is low. As a result, a line capacitance between the first wire and the second wire can be reduced.

According to this coil component, a line capacitance between the first wire and the second wire can be reduced in the overlapping winding region.

Other features, elements, characteristics and advantages of the present disclosure will become more apparent from the following detailed description of preferred embodiments of the present disclosure with reference to the attached drawings.

DETAILED DESCRIPTION

First Embodiment

Figure 1:
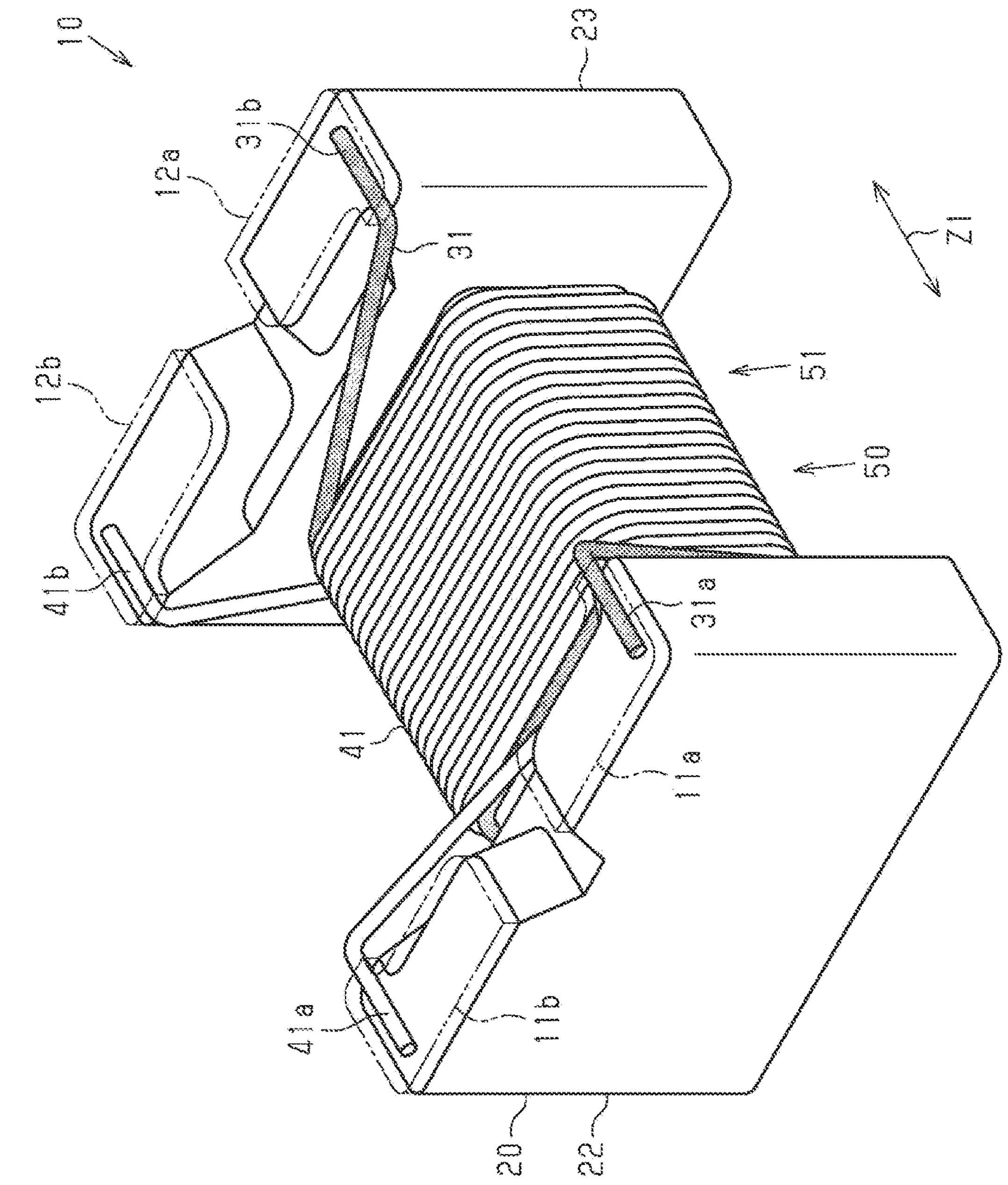
FIG. 1 is a perspective view illustrating a coil component of a First Embodiment.

Hereafter, a coil component of an embodiment will be described while referring to FIGS. 1 to 9. In the drawings, constituent elements may be illustrated in an enlarged manner for ease of understanding. The dimensional ratios of the constituent elements may differ from the actual ratios or may differ from the ratios in other drawings. Furthermore, hatching is used in the sectional views, but the hatching of some constituent elements may be omitted for ease of understanding.

Figure 2:
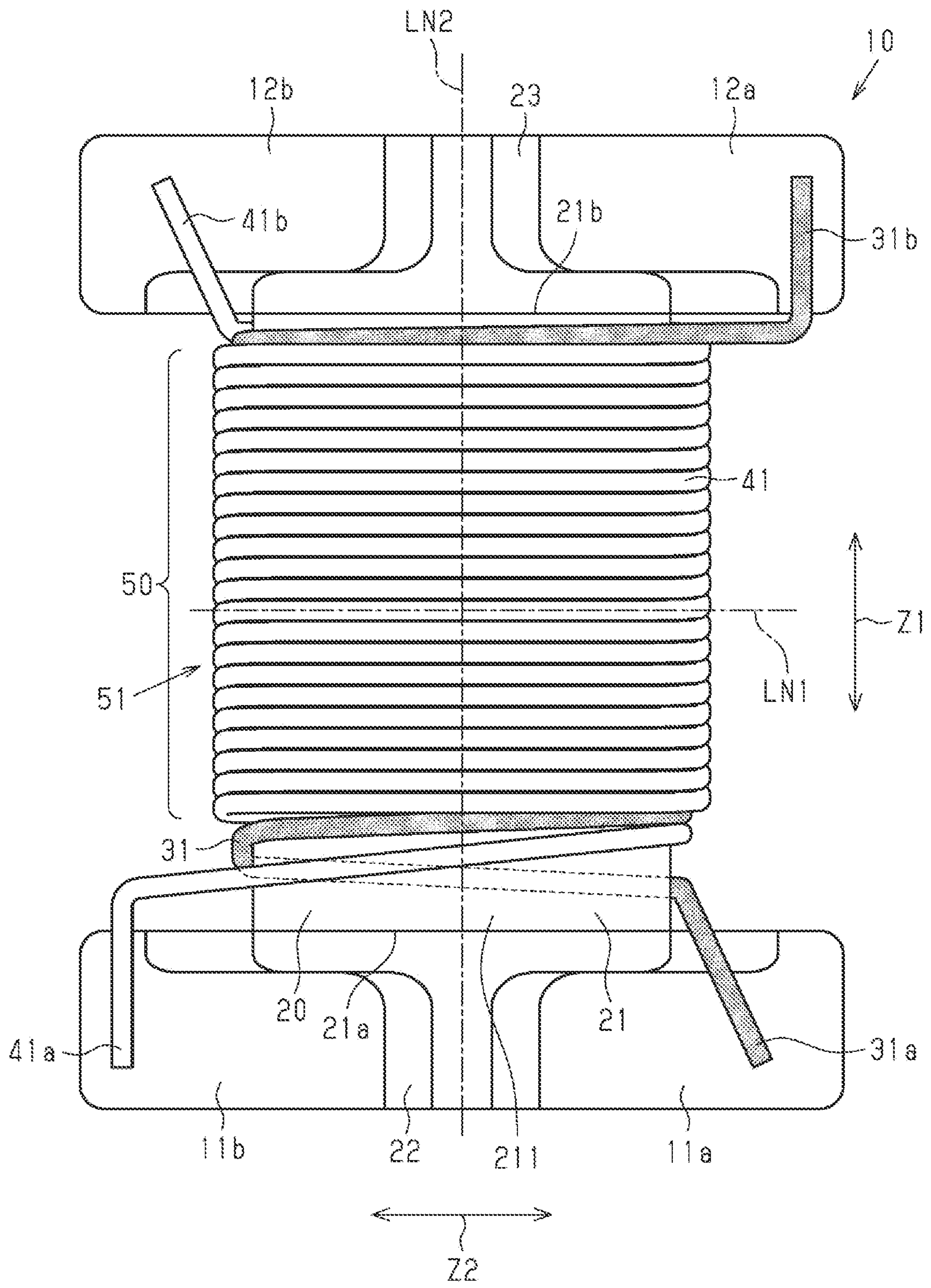
FIG. 2 is a plan view of the coil component of the First Embodiment.

As illustrated in FIGS. 1 and 2, a coil component 10 includes a core 20 and a plurality of wires 31 and 41 that are wound around the core 20. The coil component 10 is a common mode choke coil, for example.

The core 20 contains an electrically insulating material, for example. Specifically, the core 20 contains a non-magnetic material such as alumina or resin and a magnetic material such as ferrite or a resin containing magnetic powder. The core 20 is preferably composed of a sintered body composed of alumina or ferrite, for example.

The core 20 has a substantially polygon-shaped winding core part 21, a first flange part 22 connected to a first end 21*a* of the winding core part 21 in an axial direction Z1, and a second flange part 23 connected to a second end 21*b* of the winding core part 21 in the axial direction Z1. The axial direction Z1 is a direction in which a center axis F of the winding core part 21 extends.

Figure 3:
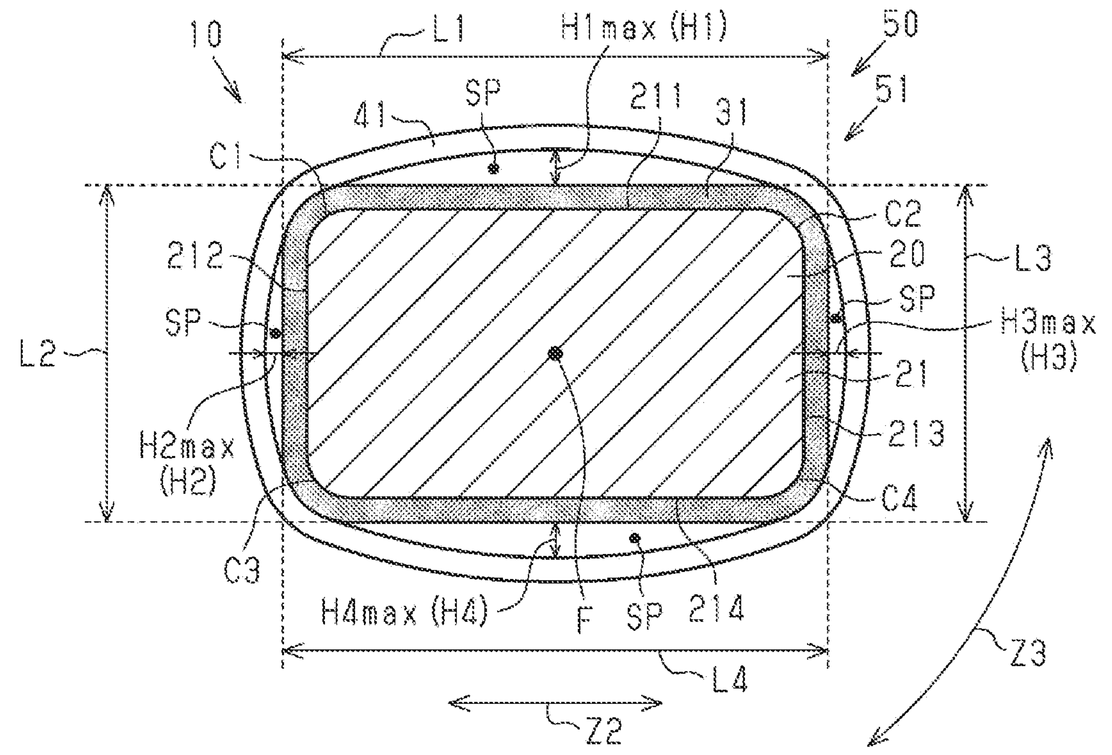
FIG. 3 is a diagram schematically illustrating the cross-sectional shape of the coil component of the First Embodiment.

FIG. 3 is a schematic diagram of a cross section obtained when the coil component 10 is cut along a line LN1 illustrated in FIG. 2. The line LN1 is an imaginary straight line that extends in a direction perpendicular to the axial direction Z1 and passes through the center of the core 20 in the axial direction Z1. In other words, the cross section of the winding core part 21 illustrated in FIG. 3 is a cross section obtained when the winding core part 21 is cut in a direction perpendicular to the axial direction Z1. As illustrated in FIG. 3, the winding core part 21 may be a substantially quadrangular prism. In other words, the winding core part 21 does not have to be a quadrangular prism so long as the winding core part 21 is substantially prism shaped.

As illustrated in FIG. 3, in the case where the winding core part 21 is a substantially quadrangular prism, the winding core part 21 has four side surfaces 211, 212, 213, and 214. In a peripheral direction Z3 centered on the center axis F of the winding core part 21, a first end of the side surface 211 is connected to a second end of the side surface 212 via a corner C1. A second end of the side surface 211 is connected to a first end of the side surface 213 via a corner C2. A first end of the side surface 212 is connected to a second end of the side surface 214 via a corner C3. A second end of the side surface 213 is connected to a first end of the side surface 214 via a corner C4. Here, "first end of a side surface" refers to an end located in the counterclockwise direction in FIG. 3 and "second end of a side surface" refers to an end located in the clockwise direction in FIG. 3.

In FIG. 3, the wires 31 and 41 are illustrated as rings for convenience of explanation and understanding, but in reality, the wires 31 and 41 are not rings. The length of the side surface 211, which is the shortest distance from the corner C1 to the corner C2, is taken to be a first distance L1. In other words, the first distance L1 is represented by a straight line that extends in a direction perpendicular to the axial direction Z1 among straight lines that extend from the corner C1 to the corner C2. In more detail, in the cross section of the winding core part 21 illustrated in FIG. 3, the length of the line representing the side surface 211 corresponds to the first distance L1. The length of the side surface 212, which is the shortest distance from the corner C1 to the corner C3, is taken to be a second distance L2. In other words, the second distance L2 is represented by a straight line that extends in a direction perpendicular to the axial direction Z1 among straight lines that extend from the corner C1 to the corner C3. In more detail, in the cross section of the winding core part 21 illustrated in FIG. 3, the length of the line representing the side surface 212 corresponds to the second distance L2. The length of the side surface 213, which is the shortest distance from the corner C2 to the corner C4, is taken to be a third distance L3. In other words, the third distance L3 is represented by a straight line that extends in a direction perpendicular to the axial direction Z1 among straight lines that extend from the corner C2 to the corner C4. In more detail, in the cross section of the winding core part 21 illustrated in FIG. 3, the length of the line representing the side surface 213 corresponds to the third distance L3. The length of the side surface 214, which is the shortest distance from the corner C3 to the corner C4, is taken to be a fourth distance L4. In other words, the fourth distance L4 is represented by a straight line that extends in a direction perpendicular to the axial direction Z1 among straight lines that extend from the corner C3 to the corner C4. In more detail, in the cross section of the winding core part 21 illustrated in FIG. 3, the length of the line representing the side surface 214 corresponds to the fourth distance L4. For example, in the example illustrated in FIG. 3, the first distance L1 is longer than the second distance L2 and is longer than the third distance L3. In addition, for example, the fourth distance L4 is longer than the second distance L2 and is longer than the third distance L3.

As described above, FIG. 3 is a diagram illustrating a case where the coil component 10 is cut in the center of the winding core part 21 in the axial direction Z1. Therefore, the first distance L1 can be said to be the straight line distance from the corner C1 to the corner C2 at the center, in the axial direction Z1, of the winding core part 21. The second distance L2 can be said to be the straight line distance from the corner C1 to the corner C3 at the center, in the axial direction Z1, of the winding core part 21. The third distance L3 can be said to be the straight line distance from the corner C2 to the corner C4 at the center, in the axial direction Z1, of the winding core part 21. The fourth distance L4 can be said to be the straight line distance from the corner C3 to the corner C4 at the center, in the axial direction Z1, of the winding core part 21.

As illustrated in FIGS. 1 and 2, the first wire 31 and the second wire 41 are wound around the winding core part 21. In other words, the first wire 31 and the second wire 41 are each wound in a substantially helical shape around the winding core part 21. In addition, the direction in which the first wire 31 is wound around the winding core part 21 is the same as the direction in which the second wire 41 is wound around the winding core part 21. In addition, the number of turns of the first wire 31 around the winding core part 21 is substantially the same as the number of turns of the second wire 41 around the winding core part 21.

In this embodiment, the first wire 31 is directly wound around the winding core part 21. The second wire 41 is wound around the winding core part 21 around which the first wire 31 has been wound. The coil component 10 can be said to have an overlapping winding region 50 where the "overlapping winding region 50" is defined as the region where the first wire 31 is wound around the winding core part 21 and the second wire 41 is then wound around the winding core part 21 on top of the first wire 31.

A first terminal electrode 11*a* and a second terminal electrode 11*b* are provided on the first flange part 22. That is, the second terminal electrode 11*b* is disposed at the same position as the first terminal electrode 11*a* in the axial direction Z1. Furthermore, the second terminal electrode 11*b* is disposed on the opposite side from the first terminal electrode 11*a* with the center axis F of the winding core part 21 therebetween in a direction perpendicular to the axial direction Z1.

A third terminal electrode 12*a* and a fourth terminal electrode 12*b* are provided on the second flange part 23. That is, the fourth terminal electrode 12*b* is disposed at the same position as the third terminal electrode 12*a* in the axial direction Z1. Furthermore, the fourth terminal electrode 12*b* is disposed on the opposite side from the third terminal electrode 12*a* with the center axis F of the winding core part 21 therebetween in a direction perpendicular to the axial direction Z1.

The first terminal electrode 11*a* and the third terminal electrode 12*a* are disposed on a first side (right hand side in FIG. 2) in a direction perpendicular to the axial direction Z1. The second terminal electrode 11*b* and the fourth terminal electrode 12*b* are disposed on a second side (left hand side in FIG. 2) in a direction perpendicular to the axial direction Z1.

A first end portion 31*a* of the first wire 31 is electrically connected to the first terminal electrode 11*a* and a second end portion 31*b* of the first wire 31 is electrically connected to the third terminal electrode 12*a*. On the other hand, a first end portion 41*a* of the second wire 41 is electrically connected to the second terminal electrode 11*b* and a second end portion 41*b* of the second wire 41 is electrically connected to the fourth terminal electrode 12*b*. In other words, the first end portion 31*a* and the second end portion 31*b* of the first wire 31 are electrically connected to terminal electrodes that are located on the first side (right hand side in FIG. 2) in a direction perpendicular to the axial direction Z1. The first end portion 41*a* and the second end portion 41*b* of the second wire 41 are electrically connected to terminal electrodes that are located on the second side (left hand side in FIG. 2) in a direction perpendicular to the axial direction Z1.

Figure 4:
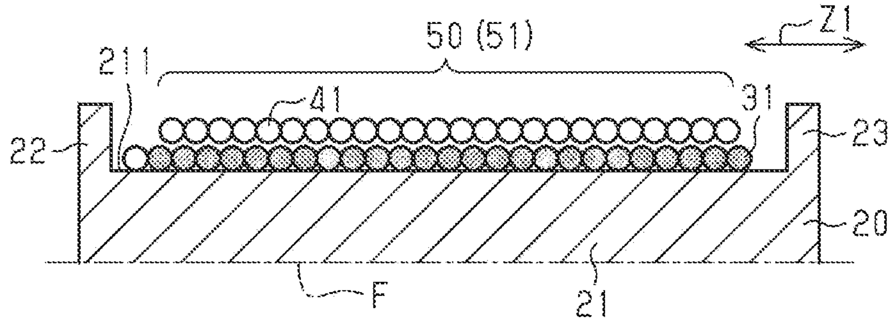
FIG. 4 is a diagram schematically illustrating the cross-sectional shape of part of the coil component of the First Embodiment.

Next, the overlapping winding region 50 will be described in detail while referring to FIGS. 3 to 6. FIG. 4 schematically illustrates part of a cross section obtained when the coil component 10 is cut along a line LN2 illustrated in FIG. 2. When a direction that is perpendicular to the axial direction Z1, among directions that extend along the side surface 211, is taken to be a "width direction Z2", the line LN2 is an imaginary straight line that extends in the axial direction Z1 and passes through a center position, in the width direction Z2, on the side surface 211. In other words, the cross section of the winding core part 21 illustrated in FIG. 4 is part of a cross section obtained when the winding core part 21 is cut along a direction perpendicular to the width direction Z2.

Figure 5:
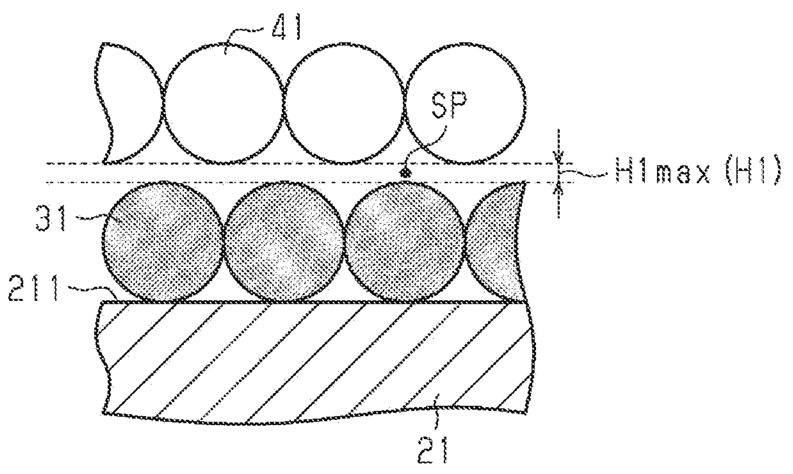
FIG. 5 is an enlarged view of part of FIG. 4.

As illustrated in FIGS. 3, 4, and 5, the overlapping winding region 50 includes a prescribed part 51. In this embodiment, the prescribed part 51 is a part, of the overlapping winding region 50, where the first wire 31 and the second wire 41 are wound around the winding core part 21 so that all of the following conditions (B1), (B2), (B3), and (B4) are satisfied.

(B1) A gap SP is interposed between parts of the first wire 31 wound along the side surface 211 and parts of the second wire 41 wound along the side surface 211.

(B2) A gap SP is interposed between parts of the first wire 31 wound along the side surface 212 and parts of the second wire 41 wound along the side surface 212.

(B3) A gap SP is interposed between parts of the first wire 31 wound along the side surface 213 and parts of the second wire 41 wound along the side surface 213.

(B4) A gap SP is interposed between parts of the first wire 31 wound along the side surface 214 and parts of the second wire 41 wound along the side surface 214.

In this embodiment, the prescribed part 51 satisfies all of the above conditions (B1) to (B4). However, the embodiment is not limited to this configuration. For example, the prescribed part may be a part where the first wire 31 and the second wire 41 are wound around the winding core part 21 so as to satisfy any one condition among the above conditions (B1) to (B4). In other words, in the prescribed part, it is sufficient that the gap SP be interposed between parts of the first wire 31 and the second wire 41 wound along at least one side surface among the side surfaces 211 to 214 of the winding core part 21. More preferably, in the prescribed part 51, the gap SP is disposed between the first wire 31 and the second wire 41 on the side surface having the longest distance among the distances L1 to L4.

An interval H1 between the first wire 31 and the second wire 41 wound along the side surface 211 will be described. The interval H1 is "0" at the corner C1. In other words, the first wire 31 and the second wire 41 contact each other. The interval H1 increases from the corner C1 toward the corner C2. The interval H1 is maximum at a center position between the corner C1 and the corner C2. The maximum value of the interval H1 is referred to as "maximum interval H1max". The interval H1 decreases from the center position toward the corner C2. The interval H1 is "0" at the corner C2. In other words, the first wire 31 and the second wire 41 contact each other.

An interval H4 between the first wire 31 and the second wire 41 wound along the side surface 214 will be described. The interval H4 is "0" at the corner C3. In other words, the first wire 31 and the second wire 41 contact each other. The interval H4 increases from the corner C3 toward the corner C4. The interval H4 is maximum at a center position between the corner C3 and the corner C4. The maximum value of the interval H4 is referred to as "maximum interval H4max". The interval H4 decreases from the center position toward the corner C4. The interval H4 is "0" at the corner C4. In other words, the first wire 31 and the second wire 41 contact each other.

An interval H2 between the first wire 31 and the second wire 41 wound along the side surface 212 will be described. The interval H2 is "0" at the corner C1. In other words, the first wire 31 and the second wire 41 contact each other. The interval H2 increases from the corner C1 toward the corner C3. The interval H2 is maximum at a center position between the corner C1 and the corner C3. The maximum value of the interval H2 is referred to as "maximum interval H2max". The interval H2 decreases from the center position toward the corner C3. The interval H2 is "0" at the corner C3. In other words, the first wire 31 and the second wire 41 contact each other.

An interval H3 between the first wire 31 and the second wire 41 wound along the side surface 213 will be described. The interval H3 is "0" at the corner C2. In other words, the first wire 31 and the second wire 41 contact each other. The interval H3 increases from the corner C2 toward the corner C4. The interval H3 is maximum at a center position between the corner C2 and the corner C4. The maximum value of the interval H3 is referred to as "maximum interval H3max". The interval H3 decreases from the center position toward the corner C4. The interval H3 is "0" at the corner C4. In other words, the first wire 31 and the second wire 41 contact each other.

In this embodiment, the first distance L1 and the fourth distance L4 are longer than the second distance L2 and are longer than the third distance L3. Therefore, as illustrated in FIG. 3, the maximum interval H1max is larger than both the maximum interval H2max and the maximum interval H3max. Similarly, the maximum interval H4max is larger than both the maximum interval H2max and the maximum interval H3max.

Figure 6:
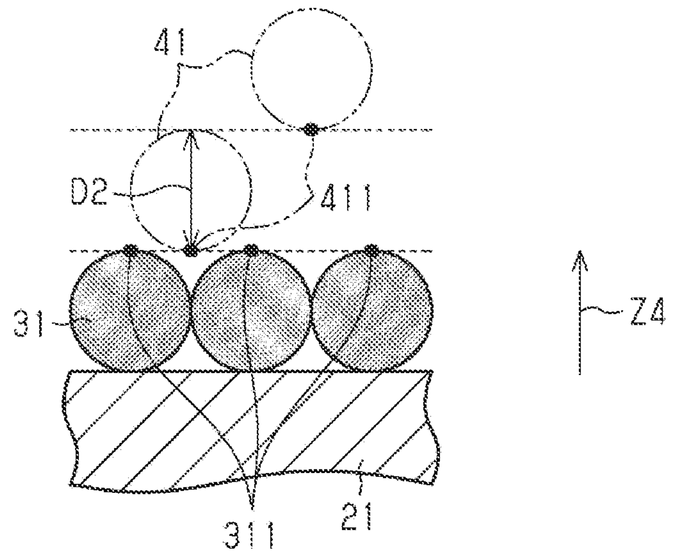
FIG. 6 is a schematic diagram for describing the positional relationship between the first wire and the second wire.

As illustrated in FIG. 6, the maximum intervals H1max, H2max, H3max, and H4max are set so as to satisfy the following conditions (A1) and (A2). An "upper limit radial position" referred to below is a position separated from an outermost end 311 of the first wire 31 toward the outside by a diameter D2 of the second wire 41 in a radial direction Z4 centered on the center axis F of the winding core part 21.

(A1) An innermost end 411 of the second wire 41 in the radial direction Z4 is located further toward the outside (upper side in FIG. 6) than the outermost end 311 of the first wire 31.

(A2) The innermost end 411 of the second wire 41 in the radial direction Z4 is located further toward the inside (inner side in FIG. 6) than the upper limit radial position.

In other words, parts of the first wire 31 that are located furthermost towards the outside in the radial direction Z4 among parts of the first wire 31 wound along the side surface 211 are referred to as outermost ends 311 and parts of the second wire 41 that are located furthermost towards the inside in the radial direction Z4 among parts of the second wire 41 wound along the side surface 211 are referred to as innermost ends 411. In this case, the maximum interval H1max is set so that the innermost ends 411 of the parts of the second wire 41 wound along the side surface 211 are located radially outside the outermost ends 311 of the parts of the first wire 31 wound along the side surface 211 and so that the innermost ends 411 of the second wire 41 are located further toward the inside than a position that is separated from the outermost ends 311 of the first wire 31 by the diameter D2.

Parts of the first wire 31 that are located furthermost towards the outside in the radial direction Z4 among parts of the first wire 31 wound along the side surface 212 are referred to as outermost ends 311 and parts of the second wire 41 that are located furthermost towards the inside in the radial direction Z4 among parts of the second wire 41 wound along the side surface 212 are referred to as innermost ends 411. In this case, the maximum interval H2max is set so that the innermost ends 411 of the parts of the second wire 41 wound along the side surface 212 are located radially outside the outermost ends 311 of the parts of the first wire 31 wound along the side surface 212 and so that the innermost ends 411 of the second wire 41 are located further toward the inside than a position that is separated from the outermost ends 311 of the first wire 31 by the diameter D2.

Parts of the first wire 31 that are located furthermost towards the outside in the radial direction Z4 among parts of the first wire 31 wound along the side surface 213 are referred to as outermost ends 311 and parts of the second wire 41 that are located furthermost towards the inside in the radial direction Z4 among parts of the second wire 41 wound along the side surface 213 are referred to as innermost ends 411. In this case, the maximum interval H3max is set so that the innermost ends 411 of the parts of the second wire 41 wound along the side surface 213 are located radially outside the outermost ends 311 of the parts of the first wire 31 wound along the side surface 213 and so that the innermost ends 411 of the second wire 41 are located further toward the inside than a position that is separated from the outermost ends 311 of the first wire 31 by the diameter D2.

Parts of the first wire 31 that are located furthermost towards the outside in the radial direction Z4 among parts of the first wire 31 wound along the side surface 214 are referred to as outermost ends 311 and parts of the second wire 41 that are located furthermost towards the inside in the radial direction Z4 among parts of the second wire 41 wound along the side surface 214 are referred to as innermost ends 411. In this case, the maximum interval H4max is set so that the innermost ends 411 of the parts of the second wire 41 wound along the side surface 214 are located radially outside the outermost ends 311 of the parts of the first wire 31 wound along the side surface 214 and so that the innermost ends 411 of the second wire 41 are located further toward the inside than a position that is separated from the outermost ends 311 of the first wire 31 by the diameter D2.

As a result of satisfying (A1) above, the second wire 41 comes to be located outside the outermost ends 311 of the first wire 31 in the radial direction Z4 at the center position between the two corners located at both ends of each side surface. In addition, as a result of satisfying (A2) above, the interval between the outermost ends 311 of the first wire 31 and the innermost ends 411 of the second wire 41 at the center position between the two corners located at both ends of each side surface is smaller than the diameter D2 of the second wire 41.

However the second wire 41 contacts the first wire 31 at the corners C1 to C4. Therefore, (A1) may not be satisfied in the vicinities of the corners C1 to C4.

Among the four side surfaces 211 to 214 of the winding core part 21, if the side surface 211 is regarded as a "first side surface", the side surface 212 corresponds to a "second side surface", the side surface 213 corresponds to a "third side surface", and the side surface 214 corresponds to a "fourth side surface". In addition, the corner C1 where the side surface 211 and the side surface 212 are connected to each other corresponds to a "first corner" and the corner C2 where the side surface 211 and the side surface 213 are connected to each other corresponds to a "second corner". Furthermore, the corner C3 where the side surface 212 and the side surface 214 are connected to each other corresponds to s a "third corner" and the corner C4 where the side surface 213 and the side surface 214 are connected to each other corresponds to a "fourth corner".

Figure 7:
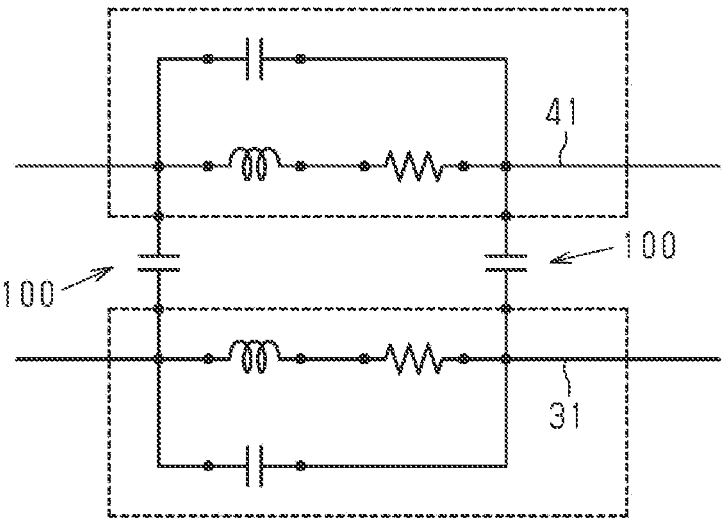
FIG. 7 is a diagram illustrating an equivalent circuit of the coil component of the First Embodiment.
Figure 8:
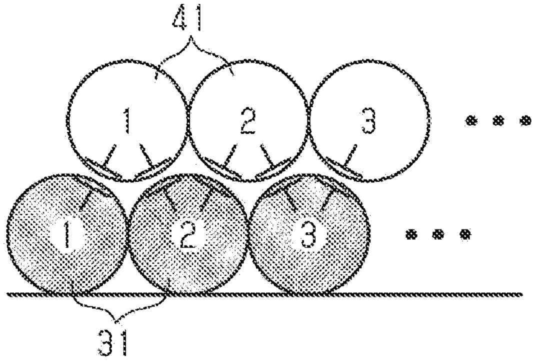
FIG. 8 is a schematic diagram for describing a situation in which line capacitances are generated between the first wire and the second wire.

Next, operation of this embodiment will be described. FIG. 7 illustrates an equivalent circuit of a coil component in which both the first wire 31 and the second wire 41 are wound around a single winding core part 21. In this case, capacitors 100 are formed in a pseudo manner by the first wire 31 and the second wire 41. In other words, line capacitances LC, which are the capacitances of the capacitors 100, are generated between the first wire 31 and parts of the second wire 41 that are close to the first wire 31. For example, as illustrated in FIG. 8, a line capacitance LC is generated between a first turn of the second wire 41 and a first turn of the first wire 31. A line capacitance LC is generated between the first turn of the second wire 41 and a second turn of the first wire 31. The sizes of the line capacitances LC are inversely proportional to the physical distances between the wires 31 and 41. Therefore, the line capacitances LC become larger as the interval between the first wire 31 and the second wire 41 becomes smaller. If the line capacitances LC are large, the high-frequency characteristics of the coil component may be degraded.

In the overlapping winding region 50 of the coil component 10 of this embodiment, a region is formed in which the gap SP is interposed between the first wire 31 and the second wire 41. In other words, the overlapping winding region 50 has the prescribed part 51. In the prescribed part 51, it is possible to reduce the number of parts where the interval between the first wire 31 and the second wire 41 is small.

Figure 9:
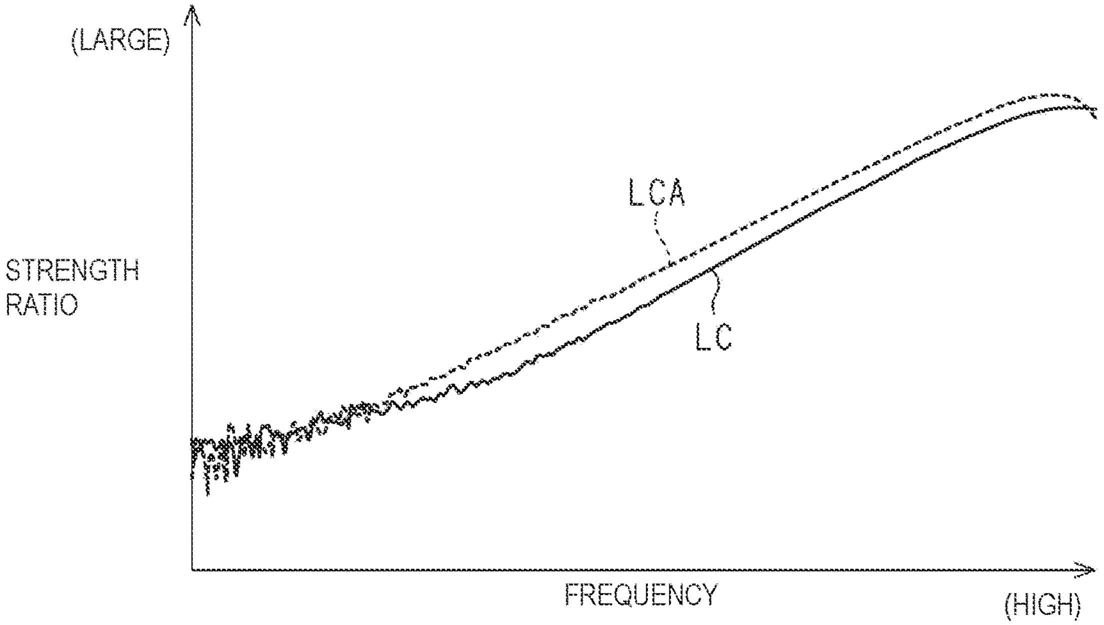
FIG. 9 is a graph illustrating the relationship between the frequency of a signal input to the coil component and the strength ratio between the signal input to the coil component and a signal output from the coil component.

Line capacitances LCA in a coil component of a comparative example in which there is no interval interposed between the first wire 31 and the second wire 41 in the overlapping winding region 50 are larger than the line capacitances LC in the coil component 10 of this embodiment. This is because there are parts where the interval between the first wire 31 and the second wire 41 is large in the overlapping winding region 50 of the coil component 10 of this embodiment, whereas there are no parts where the interval between the first wire and the second wire is large in the overlapping winding region of the coil component of the comparative example. FIG. 9 relates mode conversion characteristics and illustrates the relationship between the frequency of a signal input to a coil component and the strength ratio between the signal input to the coil component and a signal output from the coil component. In FIG. 9, the broken line represents this relationship for the coil component of the comparative example and the solid line represents this relationship for the coil component 10 of this embodiment. When the frequency of the signal input to the coil components is comparatively low, the size of the strength ratio in the coil component 10 of this embodiment is substantially the same as the size of the strength ratio in the coil component of the comparative example. However, since the line capacitances LC are small, when the frequency of the input signal becomes high, a difference occurs between the size of the strength ratio in the coil component 10 of this embodiment and the size of the strength ratio in the coil component of the comparative example. Specifically, the size of the strength ratio in the coil component 10 of this embodiment is smaller than the size of the strength ratio in the coil component of the comparative example. Therefore, the mode conversion characteristics at high frequencies for the coil component 10 of this embodiment are superior to the mode conversion characteristics at high frequencies for the coil component of the comparative example. In other words, the high-frequency characteristics of the coil component 10 of this embodiment are superior to the high-frequency characteristics of the coil component of the comparative example.

In this embodiment, the following effects can also be obtained.

(1-1) In the prescribed part 51, a region is formed in which the gap SP is interposed between the first wire 31 wound around the winding core part 21 and the second wire 41 around the winding core part 21 on top of the first wire 31. By providing parts where there is a long distance between the first wire 31 and the second wire 41 in this way, the line capacitances LC generated between the first wire 31 and the second wire 41 can be reduced by an amount resulting from it being possible to form parts where there is a low wire density. The high-frequency characteristics of the coil component 10 can be improved by reducing the line capacitances LC.

(1-2) In this embodiment, the entirety of the overlapping winding region 50 in the axial direction Z1 serves as the prescribed part 51. The higher the proportion of the overlapping winding region 50 that is occupied by the prescribed part 51, the more the effect of reducing the line capacitances LC generated between the first wire 31 and the second wire 41 can be increased.

Here, "the entirety of the overlapping winding region 50" does not have to include winding start parts of the first wire 31 and the second wire 41 and winding end parts of the first wire 31 and the second wire 41. This is because the tension of the wires is not stable at the winding start parts and winding end parts of the wires depending on the winding method used. When the tension of the wires is not stable, it is difficult to appropriately adjust the position of the second wire 41 relative to the first wire 31. It goes without saying that when it is possible to stabilize the tensions of the wires at the winding start parts and winding end parts of the wires, the prescribed part 51 may include the winding start parts of the wires and the prescribed part 51 may include the winding end parts of the wires.

(1-3) The interval between the parts of the first wire 31 and the second wire 41 wound along a side surface where there is a longer straight line distance from the first end to the second end of the side surface in the peripheral direction Z3 is larger than the interval between the parts of the first wire 31 and the second wire 41 wound along a side surface where there is a shorter straight line distance from the first end to the second end of the side surface in the peripheral direction Z3. The effect of reducing the line capacitances LC generated between the first wire 31 and the second wire 41 can be increased by increasing the interval between the parts of the first wire 31 and the second wire 41 wound along the side surfaces having a long straight line distance between the first ends and the second ends of the side surfaces.

(1-4) In this embodiment, in the prescribed part 51, the first wire 31 and the second wire 41 are wound around the winding core part 21 so as to satisfy (A1) above. This enables the interval between the first wire 31 and the second wire 41 to be increased and consequently enables the line capacitances LC to be reduced.

(1-5) In this embodiment, in the prescribed part 51, the first wire 31 and the second wire 41 are wound around the winding core part 21 so as to satisfy (A2) above. This enables the second wire 41 to remain wound around the winding core part 21 without disturbing winding of the second wire 41.

Second Embodiment

Next, a coil component of a Second Embodiment will be described while referring to FIGS. 10 and 11. In the following description, parts that are different from those in the First Embodiment will be mainly described and constituent elements that are identical to or correspond to those in the First Embodiment are denoted by the same symbols and repeated description thereof is omitted.

Figure 10:
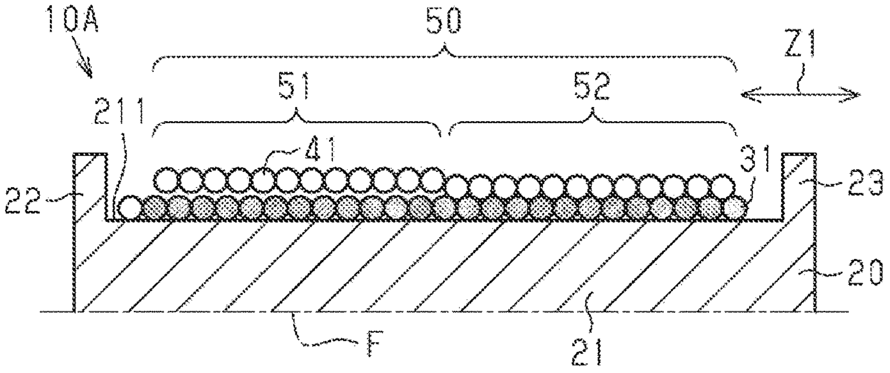
FIG. 10 is a diagram schematically illustrating the cross-sectional shape of part of a coil component of a Second Embodiment.
Figure 11:
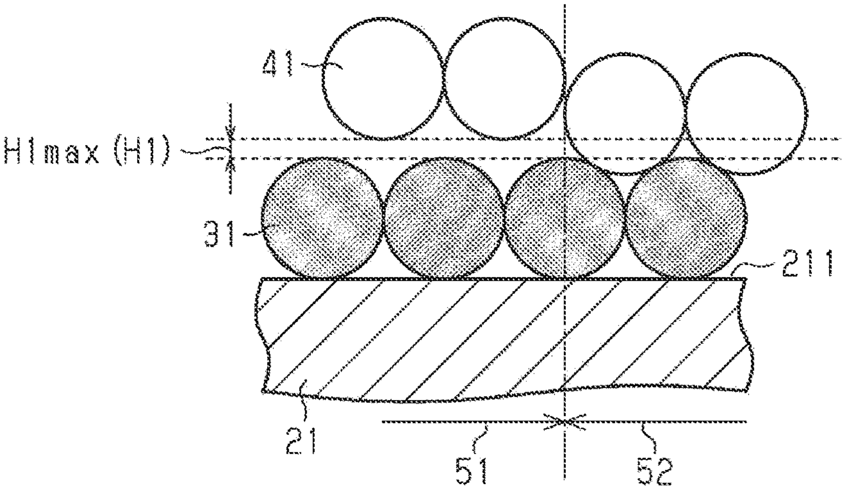
FIG. 11 is an enlarged view of part of FIG. 10.

As illustrated in FIG. 10, a coil component 10A includes the overlapping winding region 50. The overlapping winding region 50 has the prescribed part 51. However, as illustrated in FIGS. 10 and 11, part of the overlapping winding region 50 in the axial direction Z1 constitutes the prescribed part 51, but the remaining part is not included in the prescribed part 51. The part of the overlapping winding region 50 that is not included in the prescribed part 51 is termed a "non-prescribed part 52".

In the example illustrated in FIG. 10, a region of the overlapping winding region 50 that is near the first flange part 22 in the axial direction Z1 forms the prescribed part 51. A region of the overlapping winding region 50 that is nearer the second flange part 23 than the prescribed part 51 forms the non-prescribed part 52. In the non-prescribed part 52, the second wire 41 is not separated from the first wire 31 between the two corners located at both sides of each side surface. In other words, the first wire 31 and the second wire 41 contact each other.

In this embodiment, the overlapping winding region 50 includes both the prescribed part 51 and the non-prescribed part 52. In this case as well, the line capacitances LC generated between the first wire 31 and the second wire 41 can be reduced compared with a case where the overlapping winding region 50 does not include the prescribed part 51. Therefore, the high-frequency characteristics of the coil component 10A can be improved.

The tension applied to the second wire 41 when winding the second wire 41 around the winding core part 21 in order to form the non-prescribed part 52 is referred to as a "reference tension". The tension applied to the second wire 41 when winding the second wire 41 around the winding core part 21 in order to form the prescribed part 51 is preferably smaller than the reference tension. This makes it possible to separate the first wire 31 from the second wire 41 between the two corners located at both sides of each side surface. In other words, this enables the prescribed part 51 to be formed.

Modifications

The above-described embodiments can be modified in the following ways. The embodiments and the following modifications can be combined with each other to the extent that they are not technically inconsistent.

In the Second Embodiment, a part of the overlapping winding region 50 that is near the second flange part 23 in the axial direction Z1 may be used as the prescribed part 51 and a part of the overlapping winding region 50 that is near the first flange part 22 in the axial direction Z1 may be used as the non-prescribed part 52.

In addition to the overlapping winding region 50, the coil component may include a bifilar region, which is a region in which the first wire 31 and the second wire 41 are wound around the winding core part 21 by performing bifilar winding.

Figure 12:
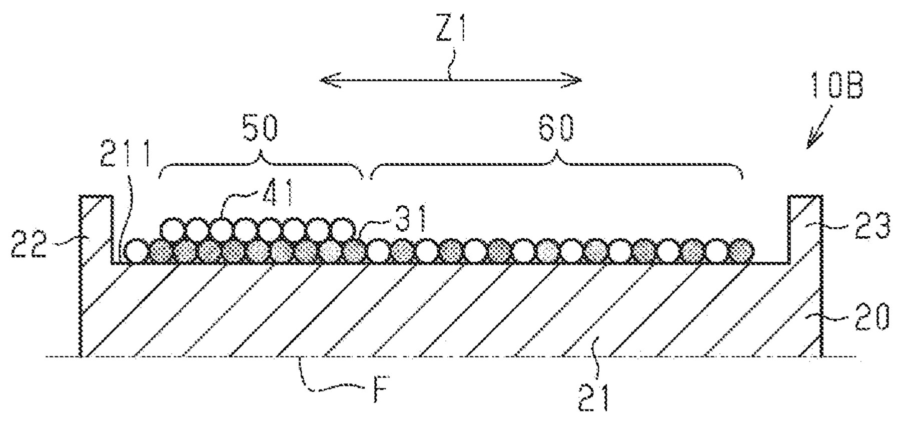
FIG. 12 is a diagram schematically illustrating the cross-sectional shape of part of a coil component of a Modification.

For example, as illustrated in FIG. 12, a coil component 10B may have a configuration in which the overlapping winding region 50 is provided near the first flange part 22 in the axial direction Z1 and a bifilar region 60 is disposed on the opposite side from the first flange part 22 with the overlapping winding region 50 interposed therebetween.

Figure 13:
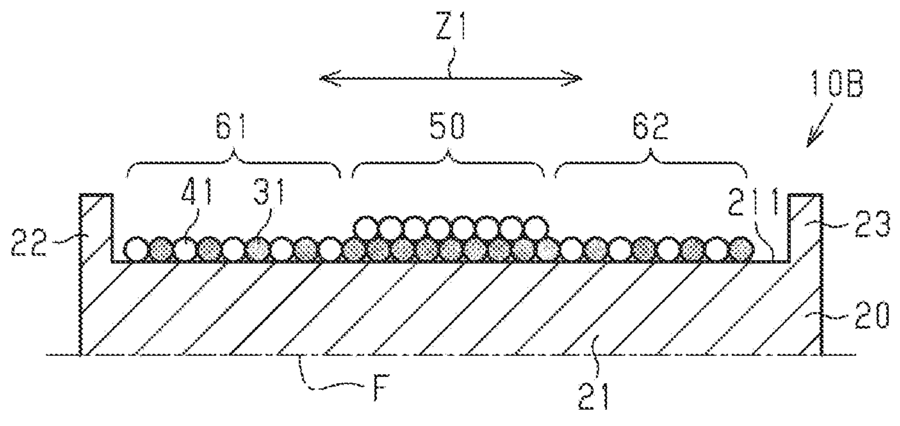
FIG. 13 is a diagram schematically illustrating the cross-sectional shape of part of a coil component of a Modification.

For example, as illustrated in FIG. 13, the coil component 10B may have a configuration in which a first bifilar region 61 is disposed near the first flange part 22 in the axial direction Z1, a second bifilar region 62 is disposed near the second flange part 23 in the axial direction Z1, and the overlapping winding region 50 is disposed between the first bifilar region 61 and the second bifilar region 62.

Figure 14:
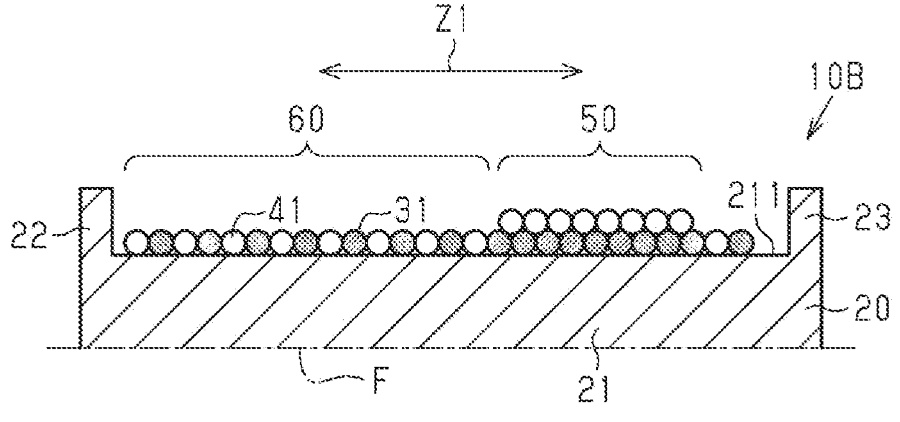
FIG. 14 is a diagram schematically illustrating the cross-sectional shape of part of a coil component of a Modification.

For example, as illustrated in FIG. 14, the coil component 10B may have a configuration in which the overlapping winding region 50 is provided near the second flange part 23 in the axial direction Z1 and the bifilar region 60 is disposed on the opposite side from the second flange part 23 with the overlapping winding region 50 interposed therebetween.

For example, the coil component 10B may have a configuration in which a first overlapping winding region is disposed near the first flange part 22 in the axial direction Z1, a second overlapping winding region is disposed near the second flange part 23 in the axial direction Z1, and the bifilar region 60 is disposed between the first overlapping winding region and the second overlapping winding region.

The overlapping winding region may have a configuration in which the prescribed part 51 and the non-prescribed part 52 are disposed in an alternating manner in the axial direction Z1.

The length of the prescribed part 51 in the axial direction Z1 may be a length corresponding to one turn of the first wire 31. In other words, in the overlapping winding region, it is sufficient that the gap SP be interposed between the part of the first wire 31 that is wound along the first side surface and the part of the second wire 41 that is wound along the first side surface at just one place.

In the prescribed part 51, so long as part of the second wire 41 that is wound around the side surface 211 is separated from part of the first wire 31 that is wound around the side surface 211, (A1) above does not have to be satisfied. In other word, so long as the prescribed part 51 includes a part where the second wire 41 is separated from the first wire 31 on the side surface 211, the prescribed part 51 may include a part where the second wire 41 contacts the first wire 31 on the side surface 211.

In the prescribed part 51, (A2) above does not have to be satisfied.

The maximum interval H2max may be the same as the maximum interval H1max or may be larger than the maximum interval H1max.

The maximum interval H3max may be the same as the maximum interval H1max or may be larger than the maximum interval H1max.

In the prescribed part 51, the first wire 31 and the second wire 41 may be wound around the winding core part 21 so that the interval H1 is maximum at a different position from the center position between the corner C1 and the corner C2.

In the prescribed part 51, the first wire 31 and the second wire 41 may be wound around the winding core part 21 so that the interval H2 is maximum at a different position from the center position between the corner C1 and the corner C3.

In the prescribed part 51, the first wire 31 and the second wire 41 may be wound around the winding core part 21 so that the interval H3 is maximum at a different position from the center position between the corner C2 and the corner C4.

In the prescribed part 51, the first wire 31 and the second wire 41 may be wound around the winding core part 21 so that the interval H4 is maximum at a different position from the center position between the corner C3 and the corner C4.

In the prescribed part 51, if the interval H1 is maximum at a center position between the corner C1 and the corner C2 along part of the axial direction Z1, the interval may also be maximum at a different position from the center position between the corner C1 and the corner C2 in another part of the prescribed part 51.

In the prescribed part 51, if the interval H2 is maximum at a center position between the corner C1 and the corner C3 along part of the axial direction Z1, the interval H2 may also be maximum at a different position from the center position between the corner C1 and the corner C3 in another part of the prescribed part 51.

In the prescribed part 51, if the interval H3 is maximum at a center position between the corner C2 and the corner C4 along part of the axial direction Z1, the interval H3 may also be maximum at a different position from the center position between the corner C2 and the corner C4 in another part of the prescribed part 51.

In the prescribed part 51, if the interval H4 is maximum at a center position between the corner C3 and the corner C4 along part of the axial direction Z1, the interval H4 may also be maximum at a different position from the center position between the corner C3 and the corner C4 in another part of the prescribed part 51.

In the above-described embodiments, the cross section obtained when the winding core part 21 is cut along a direction perpendicular to the axial direction Z1 has a substantially rectangular shape, but the cross section is not limited to this shape. For example, a winding core part that has a substantially square shape in a cross section obtained by cutting the winding core part may be used as the winding core part 21.

As long as the winding core part 21 is a prism, the winding core part 21 does not have to be a quadrangular prism. For example, the winding core part may have a substantially triangular prismatic shape or substantially hexagonal prismatic shape.

In the above-described embodiments, the winding core part 21 is configured such that the side surfaces 211 to 214 are shaped like straight lines when the winding core part 21 is cut along a direction perpendicular to the axial direction Z1, but the winding core part 21 is not limited to this configuration. That is, it is sufficient that the winding core part 21 have ridge lines in a cross section obtained when the winding core part 21 is cut along a direction perpendicular to the axial direction Z1.

The coil components 10, 10A, and 10B may include a third wire in addition to the first wire 31 and the second wire 41. In this case, in the overlapping winding region 50, the first wire 31 is wound around the winding core part 21, the second wire 41 is wound around the winding core part 21 on top of the first wire 31, and the third wire is wound around winding core part 21 on top of the second wire 41. At this time, line capacitances LC generated between the second wire 41 and the third wire can be reduced by increasing the interval between the second wire 41 and the third wire.

So long as a plurality of wires are wound around the winding core part 21, the coil component does not have to be a common mode choke coil.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A coil component comprising:

a core including a prism-shaped winding core part, a first flange part that is connected to a first end of the winding core part in an axial direction of the winding core part, and a second flange part that is connected to a second end of the winding core part in the axial direction of the winding core part, and the winding core part has a first side surface, a second side surface that is connected to the first side surface via a first corner, and a third side surface that is connected to the first side surface via a second corner; and a first wire and a second wire that are wound around the winding core part, wherein an overlapping winding region is provided that is a region in which the first wire is wound around the winding core part and the second wire is wound around the winding core part on top of the first wire, the overlapping winding region includes a prescribed part that is a part in which the first wire and the second wire are wound around the winding core part in such a manner that a gap is interposed between a part of the first wire that is wound along the first side surface and a part of the second wire that is wound along the first side surface, and an interval between the first wire and the second wire in the prescribed part varies from the first corner to the second corner.

2. The coil component according to claim 1, wherein only part of the overlapping winding region in the axial direction forms the prescribed part.

3. The coil component according to claim 2, wherein the prescribed part includes a part in which the first wire and the second wire are wound around the winding core part in such a manner that an interval between a part of the first wire wound along the first side surface and a part of the second wire wound along the first side surface is maximum at a center position between the first corner and the second corner.

4. The coil component according to claim 3, wherein the winding core part is a quadrangular prism, the winding core part has a fourth side surface that is connected to the second side surface via a third corner and is connected to the third side surface via a fourth corner, a shortest distance from the first corner to the second corner is longer than a shortest distance from the first corner to the third corner and is longer than a shortest distance from the second corner to the fourth corner, and the prescribed part includes a part in which the first wire and the second wire are wound around the winding core part in such a manner that an interval between the first wire and the second wire at a center position between the first corner and the second corner is larger than an interval between the first wire and the second wire at a center position between the first corner and the third corner and is larger than an interval between the first wire and the second wire at a center position between the second corner and the fourth corner.

5. The coil component according to claim 2, wherein the second wire is located outside an outermost end of the first wire in a radial direction, which is centered on a center axis of the winding core part, at a center position between a pair of corners at both ends of each side surface in the prescribed part.

6. The coil component according to claim 2, wherein an interval between an outermost end of the first wire and an innermost end of the second wire in a radial direction, which is centered on a center axis of the winding core part, is smaller than a diameter of the second wire at a center position between pair of corners at both ends of each side surface in the prescribed part.

7. The coil component according to claim 1, wherein an entirety of the overlapping winding region in the axial direction forms the prescribed part.

8. The coil component according to claim 7, wherein the prescribed part includes a part in which the first wire and the second wire are wound around the winding core part in such a manner that an interval between a part of the first wire wound along the first side surface and a part of the second wire wound along the first side surface is maximum at a center position between the first corner and the second corner.

9. The coil component according to claim 8, wherein the winding core part is a quadrangular prism, the winding core part has a fourth side surface that is connected to the second side surface via a third corner and is connected to the third side surface via a fourth corner, a shortest distance from the first corner to the second corner is longer than a shortest distance from the first corner to the third corner and is longer than a shortest distance from the second corner to the fourth corner, and the prescribed part includes a part in which the first wire and the second wire are wound around the winding core part in such a manner that an interval between the first wire and the second wire at a center position between the first corner and the second corner is larger than an interval between the first wire and the second wire at a center position between the first corner and the third corner and is larger than an interval between the first wire and the second wire at a center position between the second corner and the fourth corner.

10. The coil component according to claim 7, wherein the second wire is located outside an outermost end of the first wire in a radial direction, which is centered on a center axis of the winding core part, at a center position between a pair of corners at both ends of each side surface in the prescribed part.

11. The coil component according to claim 7, wherein an interval between an outermost end of the first wire and an innermost end of the second wire in a radial direction, which is centered on a center axis of the winding core part, is smaller than a diameter of the second wire at a center position between pair of corners at both ends of each side surface in the prescribed part.

12. The coil component according to claim 1, wherein the prescribed part includes a part in which the first wire and the second wire are wound around the winding core part in such a manner that an interval between a part of the first wire wound along the first side surface and a part of the second wire wound along the first side surface is maximum at a center position between the first corner and the second corner.

13. The coil component according to claim 12, wherein the winding core part is a quadrangular prism, the winding core part has a fourth side surface that is connected to the second side surface via a third corner and is connected to the third side surface via a fourth corner, a shortest distance from the first corner to the second corner is longer than a shortest distance from the first corner to the third corner and is longer than a shortest distance from the second corner to the fourth corner, and the prescribed part includes a part in which the first wire and the second wire are wound around the winding core part in such a manner that an interval between the first wire and the second wire at a center position between the first corner and the second corner is larger than an interval between the first wire and the second wire at a center position between the first corner and the third corner and is larger than an interval between the first wire and the second wire at a center position between the second corner and the fourth corner.

14. The coil component according to claim 13, wherein the second wire is located outside an outermost end of the first wire in a radial direction, which is centered on a center axis of the winding core part, at a center position between a pair of corners at both ends of each side surface in the prescribed part.

15. The coil component according to claim 13, wherein an interval between an outermost end of the first wire and an innermost end of the second wire in a radial direction, which is centered on a center axis of the winding core part, is smaller than a diameter of the second wire at a center position between pair of corners at both ends of each side surface in the prescribed part.

16. The coil component according to claim 12, wherein the second wire is located outside an outermost end of the first wire in a radial direction, which is centered on a center axis of the winding core part, at a center position between a pair of corners at both ends of each side surface in the prescribed part.

17. The coil component according to claim 12, wherein an interval between an outermost end of the first wire and an innermost end of the second wire in a radial direction, which is centered on a center axis of the winding core part, is smaller than a diameter of the second wire at a center position between pair of corners at both ends of each side surface in the prescribed part.

18. The coil component according to claim 1, wherein the second wire is located outside an outermost end of the first wire in a radial direction, which is centered on a center axis of the winding core part, at a center position between a pair of corners at both ends of each side surface in the prescribed part.

19. The coil component according to claim 18, wherein an interval between an outermost end of the first wire and an innermost end of the second wire in a radial direction, which is centered on a center axis of the winding core part, is smaller than a diameter of the second wire at a center position between pair of corners at both ends of each side surface in the prescribed part.

20. The coil component according to claim 1, wherein an interval between an outermost end of the first wire and an innermost end of the second wire in a radial direction, which is centered on a center axis of the winding core part, is smaller than a diameter of the second wire at a center position between pair of corners at both ends of each side surface in the prescribed part.

* * * * *